United States Patent [19]

Hedrick, II

[11] Patent Number: 4,523,988

[45] Date of Patent: Jun. 18, 1985

[54] APPARATUS AND METHOD FOR PRODUCING VIRGIN AND/OR RECLAIMING USED ABRASIVES

[75] Inventor: Harold M. Hedrick, II, Houston, Tex.

[73] Assignee: Apache Equipment, Inc., Houston, Tex.

[21] Appl. No.: 524,452

[22] Filed: Aug. 18, 1983

[51] Int. Cl.³ .......................... B07B 4/02; B07B 7/02
[52] U.S. Cl. ........................................ 209/11; 51/425; 209/29; 209/37; 209/143
[58] Field of Search .................. 51/425; 209/11, 28, 209/29, 36, 37, 142, 143

[56] References Cited

U.S. PATENT DOCUMENTS

| | | | |
|---|---|---|---|
| 2,261,947 | 11/1941 | Barnebl et al. | 51/425 X |
| 2,657,797 | 11/1953 | Ledgett et al. | 209/37 X |
| 2,658,615 | 11/1953 | Ebersole | 209/11 |
| 2,696,910 | 12/1954 | Ljungdell et al. | 51/425 X |
| 3,694,964 | 10/1972 | Bowling, Jr. | 51/425 |
| 3,716,947 | 2/1973 | Carpenter et al. | 51/425 X |
| 3,802,916 | 4/1974 | Jackson | 209/444 X |
| 3,829,029 | 8/1974 | Carpenter et al. | 51/425 X |
| 3,934,373 | 1/1976 | Leliaert et al. | 51/425 |
| 3,981,104 | 9/1976 | Dreher | 51/425 |
| 4,222,858 | 9/1980 | Avila et al. | 209/11 |

Primary Examiner—Robert H. Spitzer
Attorney, Agent, or Firm—Bernard A. Reiter

[57] ABSTRACT

Disclosed is a method of and apparatus for processing new or reclaiming used abrasive material such as that material used in the surface preparation of structural steel prior to the application of paint or other protective coating. A stream of wet abrasive material, debris and contaminants is placed in a pre-scalper which serves to separate out components thereof having diameter greater than one (1) inch. The remaining abrasives are then conveyed to a dryer for drying. The flow of hot air through the dryer separates fines and talc from the stream of abrasives. The abrasives are then placed in a rotary scalper which serves to remove all particles greater than 3/16ths of an inch in diameter. A dust plenim surrounds the rotary scalper and serves to remove all fines and talc which pass through a 150 mesh screen. Thus, what remains is a quantity of abrasive material having particles no finer than 150 mesh and no larger than 3/16ths of an inch in diameter and such remaining abrasives are discharged into a storage bin for use or reuse.

8 Claims, 2 Drawing Figures

APPARATUS AND METHOD FOR PRODUCING VIRGIN AND/OR RECLAIMING USED ABRASIVES

BACKGROUND OF THE INVENTION

The present invention relates to a method and apparatus useful in cleaning and reclaiming used or new abrasives. More particularly, this invention relates to an improved method and apparatus for reclaiming and recycling spent abrasives, or producing virgin abrasives, which are used in the surface preparation of structural steel prior to the application of paint or other protective coatings.

DESCRIPTION OF THE PRIOR ART

The prior art is replete with disclosures which detail grit and sandblasting machines and methods. One such disclosure is detailed in U.S. Pat. No. 3,981,104 issued to Alfred J. Dreher. Therein is revealed a grit blasting machine and method in which particles of metal grit are projected against a surface from which scale is to be removed with the grit thereafter being recovered and recirculated. The primary object of this particular disclosure is a substantial reduction of wear of the machine parts due to frictional contact with the spent grit during recovery. The invention further details a magnetic pickup type confirmation and utilization of a metal grit having a soft magnetic property. The invention further details a vehicle movable in a forward direction along a longitudinal path over the surface to be cleaned.

Another such abrasive blast cleaning system is detailed in U.S. Pat. No. 3,829,029 granted to James H. Carpenter directed to a blast means for granulating and scouring sand. In this particular disclosure the sand is reconditioned for re-use in subsequent blast operations. Although generally satisfactory such prior art machines can be subject to certain problems. For example, in the steel grit recovery system, reclamation is not independent of the blast operation and steel grit abrasives generally cannot be reclaimed after contamination by moisture. Sandblast operations are inherently plagued by the presence of free silica in the air, and invariably silicosis, are health hazards resulting from its usage. Still further, sand has a very slow cutting rate and cannot be reclaimed and reused a number of times.

SUMMARY OF THE INVENTION

In view of the foregoing, it is an object of the present invention to disclose an apparatus and method for the reclamation of abrasives having numerous advantages over prior art recovery systems and sand-blast systems.

It is another object of the present invention to provide an apparatus and method which contemplates the utilization of abrasives which may be reclaimed after contamination by moisture.

It is another object of the present invention to provide an apparatus and method for the reclamation of abrasives, such abrasives being a replacement for sand in that there is no free silica in such abrasives and invariably no silicosis health hazard resulting from their usage.

It is a further object of the present invention to provide a method and apparatus for the reclamation of abrasives wherein the user saves money since (1) the cutting rate of abrasives is much faster than that of sand, in most instances thirty (30%) to one hundred (100%) percent faster, (2) fewer pounds of abrasive per hour are utilized, and (3) abrasives may be reclaimed and reused a number of times.

It is a further object of the present invention to provide an apparatus which details the stationary as well as a portable figuration.

It is a further object of the present invention to provide an apparatus and method which is capable of producing a virgin abrasive from the following sources: (a) water-quenched copper slag from a copper smelter, (b) wet-bottom boiler slag from a coal-fired power plant.

DESCRIPTION OF THE PREFERRED EMBODIMENT

Figure 1:
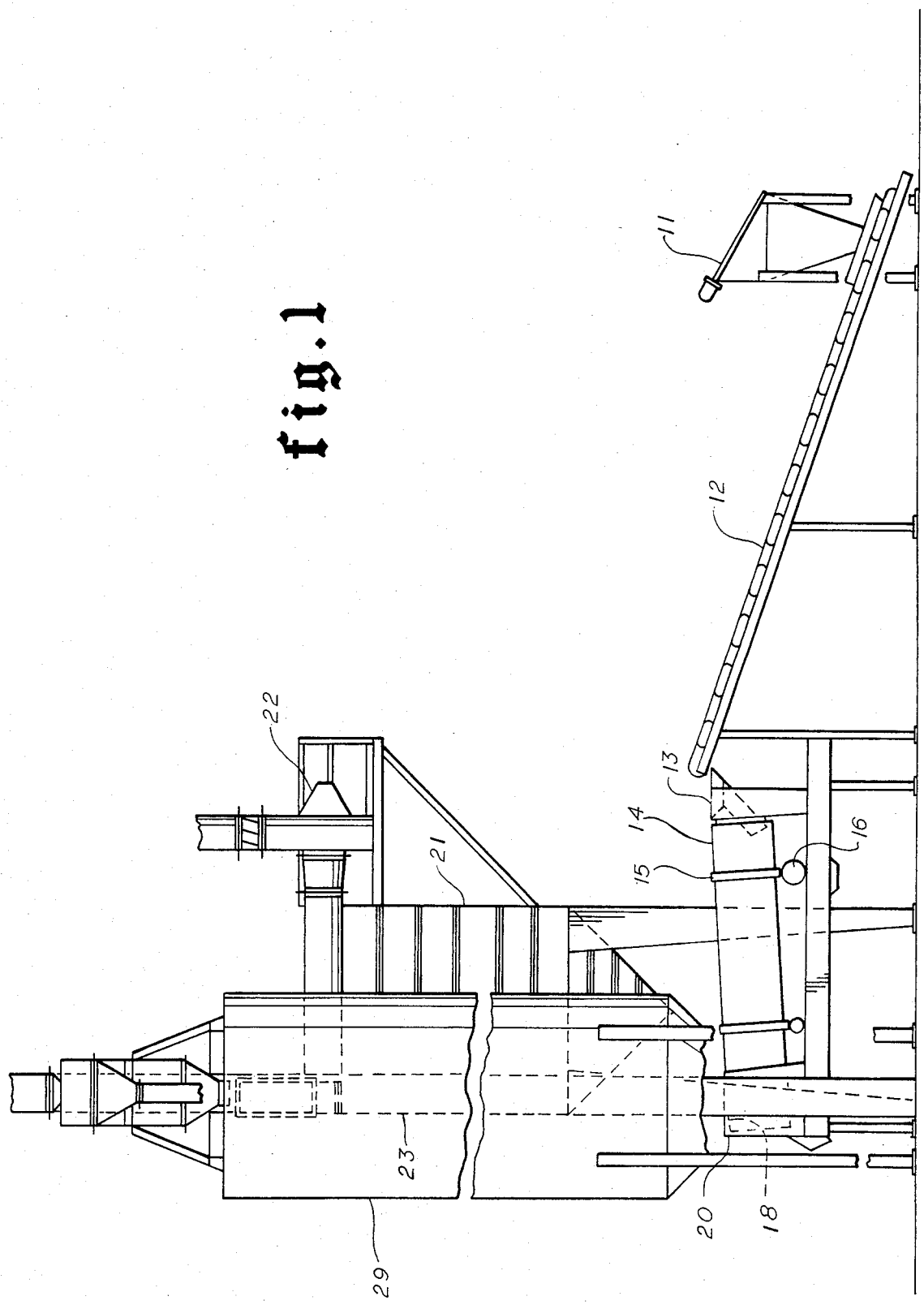
FIG. 1 is a side elevational view showing one embodiment of the present invention.

In brief, the apparatus for cleaning and reclaiming spent abrasives, or producing virgin abrasive, as detailed hereinafter comprises, in combination, a prescalper, a belt conveyor, a dryer drum, a rotary scalper, a bag house, a bucket elevator, an air wash and a storage bin or bins.

In order to achieve satisfactory economy in the use of abrasives, it is common practice to collect the spent abrasives, debris and contaminants prior to attempting recirculation. Normally this collection is stored in piles out of doors when said piles are exposed to rain and other inclement weather conditions.

In practicing the method of the invention herein, a stream of wet abrasive meterial and other debris and contaminants is poured in a prescalper. The prescalper serves to separate all materials and debris larger than one inch in diameter from the used abrasive material. The abrasive particles of appropriate size (less than one inch) fall through the bottom of the prescalper and are received on a conveyor belt. The conveyor belt delivers the separated abrasive particles to a rotary dryer drum wherein hot air dries the abrasive material.

At the discharge end of the dryer drum, or the end of the dryer drum distant from the input end, is located a rotary scalper. It should be noted that the flow of hot air through the dryer drum acts to separate dust particles or talc from the stream of material being dried. Surrounding the rotary scalper is a dust plenum which appropriately removes all fines and talc which are particles smaller than one hundred fifty mesh from the abrasive particle mixture. The rotary scalper itself has apertures of appropriate size to permit the entry of particles up to three-sixteenths of an inch (3/16") in diameter. The oversized particles, which are particles ranging in size from one inch to three-sixteenths of an inch (3/16") in diameter, are conveyed through the rotary scalper, and are discharged into a sealed "oversize bin". The talc or fines removed by the dust plenum are air suctioned into a duct which leads to a bag house having an exhaust fan and motor. The reclaimed abrasive size particles which are from one hundred fifty (150) mesh to three-sixteenths of an inch (3/16") in diameter are delivered to a bucket elevator.

Located at the top of the bucket elevator is a suitable separator. The separator is of the air-wash type and subjects the falling mixture of abrasive particles ranging in size from three-sixteenths of an inch (3/16") in diameter to one hundred fifty mesh (150) to multiple air curtains. Each air curtain acts to facilitate separation of the abrasive particle mixture in accordance with their sizes and weights. In this particular regard, the larger abrasive particles which range from fifty (50) mesh to three-sixteenths of an inch (3/16") in diameter fall downwardly into a storage bin while the smaller abrasive particles ranging in size from fifty (50) mesh to one hundred fifty (150) mesh are diverted into an inertial separator which drops out the fifty (50) to one hundred (100) mesh through a chute to ground level. The one hundred (100) mesh to one hundred fifty (150) mesh are pneumatically conveyed through air duct to the baghouse.

Figure 2:
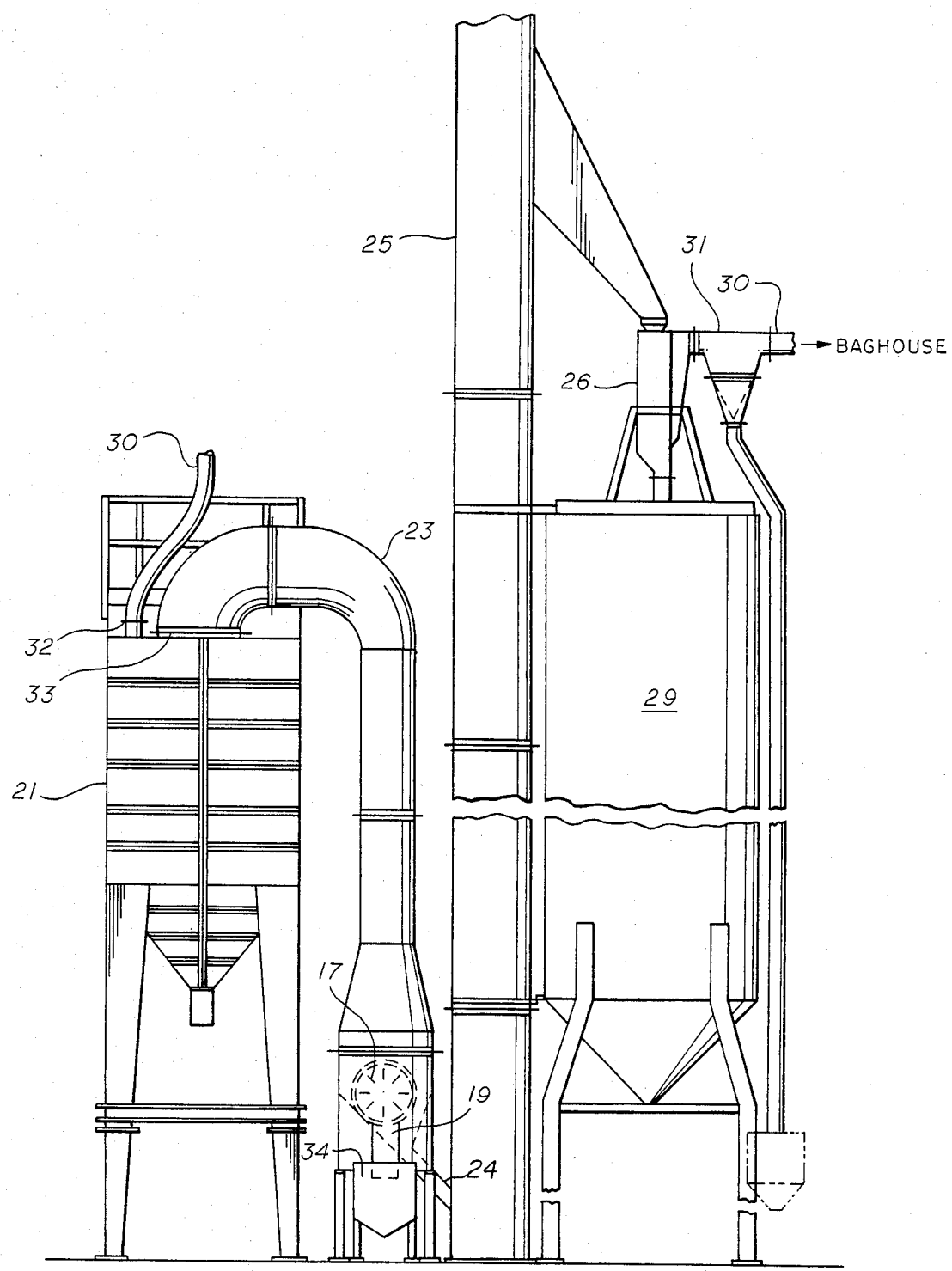
FIG. 2 is a front view of the embodiment of the invention shown in FIG. 1.

Referring now to the drawings, the apparatus of the present invention is illustrated perspectively in FIGS. 1 and 2, showing therein side and front views respectively. Such illustrations are adapted to depict the present apparatus and are shown for purposes of convenience and understanding the operation and function of the invention herein.

In accordance with the invention as depicted in FIG. 1 a stream of wet abrasive material, debris and other contaminants are poured into a prescalper 11 located at the beginning of a conveyor belt 12. The prescalper 11 serves to separate all materials and debris larger than one inch in diameter from the used abrasive material stream. The prescalper is disposed with a screen having one inch openings. The screen is suspended or isolated on springs and in connected to a rotary vibrator which serves to vibrate the material disposed thereupon causing the abrasive particles of appropriate size to fall through the bottom of the prescalper onto the conveyor belt 12. The conveyor belt 12 carries the separated abrasive particles along its length to a chute 13 which is in communication with the input end of a rotary dryer drum 14.

The rotary dryer drum 14 is sized and calculated to rotate in accordance with the feed rate of the conveyor belt 12. The dryer drum 14 is downwardly angled and is equipped with tires 15 which ride on trunnions 16 to facilitate ease of rotation and to eliminate frictional contact between the body of the dryer drum 14 and the trunnion 16. Disposed laterally within the dryer drum 14 are a plurality of radially oriented "flights" 17 (FIG. 2). The rotary action and downward angle of the dryer drum 14 is such that the abrasive particles contained therein fall from one flight to the other and proceed gravitationally toward the lower end of the dryer drum or the end furthest removed from the conveyor input end. It is preferred that the dryer drum utilized herein is a parallel flow dryer wherein the hot air and the material being dried are moving down the dryer drum in the same direction. A burner is located within the dryer drum at the input end. Also located at the input end of the dryer drum 14 is a combustion air blower which acts to supply combustion air to the parallel flow dryer utilized herein.

At the discharge end of the dryer drum 14 distant from the input chute 13 is located a rotary scalper 18 being disposed with a screen having three-sixteenths inch openings. Oversized particles (one inch to three-sixteenths inch in diameter) are denied entry through the rotary scalper and consequently drop into an oversized particle chute 19 through which they are discarded into a sealed bin 34.

Surrounding the rotary scalper 18 is a dust plenum 20 which appropriately acts to remove all fines or talc (particles smaller than one hundred fifty mesh) from the remaining abrasive particle mixture. The talc removed by the dust plenum 20 is air suctioned into a dust 23 having a dryer damper 33 disposed therein which leads to a bag house 21 having an exhaust fan and motor 22. Suction is thereby created at the discharge end of the dryer drum 14 by the operation of the suction motor 22 of the bag house 21. Thereupon, it will be realized that a push-pull phenomenon is created within the dryer drum 14 by the pushing action of the combustion air blower located at the input end of the dryer drum 14 and by the pulling action caused by the suction created by the suction motor 22 of the bag house 21.

The reclaimed abrasive sized particles (one hundred fifty mesh to three-sixteenths inch in diameter) now passing through the rotary scalper 18 are directed to an abrasive particle chute 24 which is in communication with a bucket elevator 25 wherein the reclaimed abrasive size particles are received for separation as later described.

The abrasive size particles (one hundred fifty mesh to three-sixteenths inch in diameter) are conveyed to the top of the bucket elevator where the mixture is discharged into a suitable separator 26 located at the top of the bucket elevator 25. The separator 126 is of the air-wash type and subjects the falling mixture to multiple air curtains. A plurality of skimmer plates are provided in a separating chamber to facilitate separation of the abrasive particles contained within the mixture in accordance with their sizes and weights. In this particular regard, the larger abrasive particles (fifty mesh to three-sixteenths inch in diameter) fall generally downward into a storage bin, while smaller abrasive particles are sucked into an inertial separator (31) where the intermediate fines (fifty mesh to one hundred mesh) are dropped out into a chute to ground level. The smallest abrasive particles (one hundred mesh and below) are pneumatically conveyed by air duct 30 to the bag house 21. The air duct 30 is disposed with an aspirator damper 32 at its discharge end. The larger sized abrasive particles (fifty mesh to three-sixteenths inch in diameter) now contained within the storage bin 29 may thereafter be mixed with unused abrasive particles in variable proportions for further blasting operations. The intermediate sized abrasive particles recovered (less than fifty mesh to one hundred mesh) may thereafter be used for polishing castings or the like.

It is to be understood that the present invention is not to be taken as being limited to the accompanying drawings and specifications. While a particular embodiment of the invention has been herein illustrated and described it is not intended to limit the invention to such disclosure, but changes and modifications may be made therein and thereto.

It is also to be understood that the phraseology and terminology herein employed are for purposes of description and not of limitation, since the scope of the present invention is denoted in the appended claims.

What is claimed is:

1. An apparatus for producing virgin and/or reclaiming used abrasive materials, said apparatus comprising
   (a) a pre-scalper for separating materials and debris larger than one inch (1") in diameter from used abrasive material,
   (b) a belt conveyor for receiving the separated abrasive material from said pre-scalper, and for transporting same,
   (c) a rotary dryer drum, said rotary dryer drum being adapted to receive the separated abrasive material larger than one (1") in diameter from said belt conveyor, and for drying same, (d) a rotary scalper attached to the end of the rotary dryer drum, said rotary scalper having apertures of appropriate size to permit the entry of abrasive material particles up to three-sixteenths of an inch (3/16") in diameter, (e) an oversize particle chute appropriately disposed at the end of the rotary dryer drum to aid in discarding particles larger than 3/16" in diameter;

(f) a dust plenum surrounding the rotary scalper, said dust plenum removing all particles smaller than one hundred fifty (150) mesh, with damper to control air, (g) a baghouse being in communication with said dust plenum through a duct conduit arrangement, said baghouse being itself equipped with a suction motor, (h) an abrasive particle chute appropriately disposed at the end of said rotary dryer drum for receiving abrasive size particles (3/16" to 150 mesh), (i) a bucket elevator adopted to receive abrasive size particles from said abrasive particle chute, (j) a separator connected to said bucket elevator, said separator being adopted to receive abrasive size particles from said bucket elevator and to separate said abrasive particle into particle size ranges, and (k) air duct from separator to baghouse, with damper to control size separation, (l) storage bins to receive the reclaimed and separated abrasive particles.

2. The apparatus as defined in claim 1, wherein the pre-scalper is disposed with a screen having one inch (1") openings, said screen being suspended on springs and being connected to a rotary vibrator.

3. The apparatus as defined in claim 1, wherein the rotary dryer drum is downwardly angled and equipped with tires which ride on trunnions.

4. The apparatus as defined in claim 1, wherein said rotary dryer drum is laterally disposed with a plurality of radially oriented flights.

5. The apparatus as defined in claim 1, wherein said rotary dryer drum is a parallel flow dryer having a burner and a combustion air blower located near its input end.

6. The apparatus as defined in claim 1, wherein a push-pull phenomenon is created within said rotary dryer drum by the pushing action of said combustion air blower and the pulling action of suction motor.

7. The apparatus as defined in claim 1, wherein said separator is of the air wash type which subjects the abrasive particles to an air curtain so as to facilitate separation of the abrasive particles in accordance with their sizes and weights.

8. A method for producing and/or reclaiming spent abrasive material which include the steps of:

(a) separating material larger than 1" in diameter with a pre-scalper, (b) drying the separated abrasive material in a rotary dryer drum, (c) separating material larger than 3/16" in diameter with a rotary scalper, (d) separating material smaller than 150 mesh with a dust plenum, (e) assorting the remaining material into two (2) size ranges (<50 mesh to 150 mesh and <3/16" in diameter to 50 mesh) with a final air wash, (f) inertial separator for capturing the 50 to 100 mesh intermediate fines (also protects duct), and (g) discharging the reclaimed particles into storage bins for reuse.

* * * * *